(12) United States Patent
Zaharis

(10) Patent No.: US 10,072,781 B2
(45) Date of Patent: Sep. 11, 2018

(54) CRIMPABLE SEPARABLE TUBING CLAMP

(71) Applicant: Mark J. Zaharis, Selden, NY (US)

(72) Inventor: Mark J. Zaharis, Selden, NY (US)

(73) Assignees: Todd G. Cimino, Sayville, NY (US); Mark J. Zaharis, Seldon, NY (US)

(*) Notice: Subject to any disclaimer, the term of this patent is extended or adjusted under 35 U.S.C. 154(b) by 105 days.

(21) Appl. No.: 14/222,382

(22) Filed: Mar. 21, 2014

(65) Prior Publication Data

US 2015/0267848 A1    Sep. 24, 2015

(51) Int. Cl.
*F16L 33/025*    (2006.01)

(52) U.S. Cl.
CPC .......... *F16L 33/025* (2013.01); *Y10T 24/1478* (2015.01)

(58) Field of Classification Search
CPC ....... F16L 33/025; F16L 33/035; F16L 21/00; F16L 13/14; F16L 13/141; F16L 33/02; F16L 33/023; F16L 33/04; F16L 33/2071; F16L 33/2073; F16L 33/2076; Y10T 24/1478; Y10T 24/1457; Y10T 24/1488; Y10T 24/1412; Y10T 24/1441; Y10T 24/148; Y10T 24/1482; Y10T 29/49117; Y10T 29/5367; B25B 25/005; B65D 63/02; H01R 13/5205; H01R 4/646; H01R 9/0524
USPC ............... 24/20 CW, 20 R, 20 W, 19, 20 EE, 24/20 TT, 279
See application file for complete search history.

(56) References Cited

U.S. PATENT DOCUMENTS

| | | | |
|---|---|---|---|
| 3,789,463 A | 2/1974 | Oetiker | |
| 3,869,944 A | 3/1975 | Detiker | |
| 4,315,348 A | 2/1982 | Oetiker | |
| 4,451,955 A | 6/1984 | Kern et al. | |
| 4,583,773 A | 4/1986 | Janssen et al. | |
| 4,948,178 A | 8/1990 | Sauer | |
| 4,998,326 A | 3/1991 | Oetiker | |
| 5,070,579 A | 10/1991 | Hirabayashi | |
| 5,326,325 A * | 7/1994 | Oetiker | F16F 15/34 24/20 CW |
| 6,240,603 B1 | 6/2001 | Craig, Jr. | |
| 7,093,326 B2 | 8/2006 | Oetiker | |
| 7,178,204 B2 * | 2/2007 | Bowater | F16L 33/08 24/20 R |
| 7,360,800 B2 | 4/2008 | Poll et al. | |
| 2008/0012303 A1 | 1/2008 | Poll et al. | |
| 2012/0246920 A1 | 10/2012 | Montena | |

OTHER PUBLICATIONS

USPTO as International Search Authority, International Search Report for International Application No. PCT/US2015/019906.

* cited by examiner

*Primary Examiner* — David M Upchurch
(74) *Attorney, Agent, or Firm* — Novick, Kim & Lee, PLLC; Harold L. Novick

(57) ABSTRACT

A crimpable compression clamp that secures a tube onto a fitting and is able to be installed and removed without having to separate the tube and the fitting from each other. The crimpable compression clamp includes an inner band portion and an outer band portion. The inner band portion is detachably attached in the outer band portion so as to allow the crimpable compression clamp to be installed and removed without having to separate the tube and the fitting from each other by merely separating the outer band portion and the inner band portion from each other.

35 Claims, 8 Drawing Sheets

CRIMPABLE SEPARABLE TUBING CLAMP

BACKGROUND OF THE INVENTION

Field of the Invention

The present invention relates to a clamp, and more particularly, a crimpable separable tubing clamp.

Description of the Prior Art

Numerous innovations for clamps have been provided in the prior art that will be described. Even though these innovations may be suitable for the specific individual purposes to which they address, however, they differ from the present invention.

A FIRST EXAMPLE, U.S. Pat. No. 3,789,463, Issued on Feb. 5, 1974, to Oetiker teaches a bridging member for bridging the gap formed in the circumferential band portion of a hose clamp provided with an outwardly extending fold adapted to be contracted, whereby the bridging member includes relatively thin material and includes a base portion adapted to abut against the radially inner surface of the band and side walls extending substantially at right angle to the base portion and provided with inwardly directed projections near the outer ends which can snap-in behind the outer surface of the band and thereby hold the bridging member in the assembled condition.

A SECOND EXAMPLE, U.S. Pat. No. 3,869,944, Issued on Mar. 11, 1975, to Detiker teaches a clamp for clamping a hose onto a nipple by way of an open band adapted to locked, with apparatus for the contraction of the ends of the band. To that end the band is provided with perforation apertures in the upper band end and with barbs in the lower band end which engage in the perforation apertures when the band is placed about the hose. Perforation apertures are also provided in the lower band end while a slot is provided in the upper band end within the area of the second-mentioned perforation apertures. The boundary wall of the slot is thereby provided within the area of its surface pointing away from the upper band end with an upset portion extending upwardly, i.e., outwardly.

A THIRD EXAMPLE, as shown in FIG. 1, U.S. Pat. No. 4,299,012, Issued on Nov. 10, 1981, to Oetiker teaches a hose clamp 10 that includes a narrow tongue-like extension 12 at the end of the full-width inner band portion 14 adapted to engage through a through opening 16 that commences in the outer band portion 18 at the beginning of a step-like portion 20. In addition to a typical "Oetiker" ear generally designated by reference numeral 22, which consists of two parallel outwardly extending leg portions 24 and 26 interconnected by a bridging portion 28 and provided with a reinforcing groove 30. The mechanical connection consists of a so-called guide or suspension hook 32 and of two cold-deformed, deep-drawn support hooks 34 adapted to engage in through apertures 36 in the outer band portion 18.

A FOURTH EXAMPLE, U.S. Pat. No. 4,315,348, Issued on Feb. 16, 1982, to Oetiker teaches a clamp structure with a clamping band and with at least one plastically deformable so-called "Oetiker" ear to be contracted to tighten the clamp structure about the object to be fastened, to assure a substantially smooth, gap-free transition in the circumferential direction within the area of overlap, for example, of an inner and outer band portion in the area of mechanical interlock or of an insert member and corresponding parts of the clamping band, a tongue portion is provided at each free end of the inner part which is adapted to engage in a corresponding aperture in the respective outer part when the ear is contracted.

A FIFTH EXAMPLE, U.S. Pat. No. 4,451,955, Issued on Jun. 5, 1984, to Kern, et al. teaches a crimp-type hose clamp wherein the ends of the clamp are joined in a double-layered top portion of the hat section of the clamp.

A SIXTH EXAMPLE, U.S. Pat. No. 4,583,773, Issued on Apr. 22, 1986, to Janssen, et al. teaches a releasable tubular clamp for connecting cylindrical or profile tubes. In order to provide a releasable tubular clamp for interconnecting cylindrical or profile tubes wherein the press force is increased and after assembly a greater degree of compactness and stiffness is present, a longitudinally running longitudinal rib open towards the interior is provided which prior to clamping exhibits a U-shaped (ear-shaped) cross section and whose legs after clamping abut in parts whereby the clamping jacket in an adjoining area exhibits a cross section deviating from a circular contour.

A SEVENTH EXAMPLE, U.S. Pat. No. 4,948,178, Issued on Aug. 14, 1990, to Sauer teaches a hose fitting wherein the free end of a nipple or pipe is sealingly held in one end portion of a hose by a sleeve having a tubular body with a single axially parallel slot and one or more bridges extending across the slot at the exterior of the tubular body. The latter has depressions that extend toward the nipple or pipe to urge the end portion of the hose into sealing engagement with the nipple or pipe. The sleeve can be detached from the end portion of the hose by partially or fully destroying, by deforming, or by removing the bridge or bridges so that the slot can be widened prior to separation of the sleeve from the hose.

AN EIGHTH EXAMPLE, U.S. Pat. No. 6,240,603, Issued on Jun. 5, 2001, to Craig, Jr. teaches a clamp made from clamping band material in which optimization for the length of the necessary blank is realized in dependence on the length of the bridging portion of a so-called "Oetiker" ear whereby this bridging portion length is used to determine the length of the overlapped full-band-width inner clamping band portion as well as the location of the beginning of the step-like portion and the length of the tongue-like extension at the end of the full-band-width inner clamping band portion.

A NINTH EXAMPLE, U.S. Pat. No. 7,360,800, Issued on Apr. 22, 2008, to Poll, et al. teaches a one-piece unitary compression clamp for securing a pipe or tube on a fitting. The clamp may include at least one inward deformation that provides an interference fit between the clamp and the pipe or tube. Consequently, the clamp cannot fall off the pipe or tube before being permanently crimped, and the fitting is prevented from falling out of the tube. In a second embodiment, the clamp includes an ear for crimping the clamp to the tube, and a tongue within the clamp and overlying the mouth of the ear to provide uniform compression around the entire tube.

A TENTH EXAMPLE, U.S. Patent Office Document No. 2008/0012303, Published on Jan. 17, 2008, to Poll, et al. teaches a one-piece unitary compression clamp for securing a pipe or tube on a fitting. The clamp may include at least one inward deformation that provides an interference fit between the clamp and the pipe or tube. Consequently, the clamp cannot fall off the pipe or tube before being permanently crimped, and the fitting is prevented from falling out of the tube. In a second embodiment, the clamp includes an ear for crimping the clamp to the tube, and a tongue within the clamp and overlying the mouth of the ear to provide uniform compression around the entire tube. In a third embodiment, the clamp includes stop tabs that hold the pipe at a stand-off from the end of the clamp.

AN ELEVENTH EXAMPLE, U.S. Patent Office Document No. 2012/0246920, Published on Oct. 4, 2012, to Montena teaches a grounding clamp positioned on a coaxial cable at a location other than an end of the coaxial cable. The grounding clamp includes an outer shell formed by the unity of a first split shell portion and a second split shell portion. The outer shell has a radial relationship with an elastomeric sleeve. The elastomeric sleeve is radially disposed over a conductive bonding contact. The conductive bonding contact is radially disposed over an outer conductive portion of the coaxial cable. Axial compression of a first split driver and a second split driver against the ends of the grounding clamp facilitates electrical contact between the outer shell and the conductive bonding contact and between the conductive bonding contact and the outer conductive portion of the coaxial cable. Furthermore, an associated method for maintaining ground continuity is also taught.

It is apparent now that numerous innovations for clamps have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a crimpable separable tubing clamp that avoids the disadvantages of the prior art.

ANOTHER OBJECT of the present invention is to provide a crimpable separable tubing clamp that is simple and inexpensive to manufacture.

STILL ANOTHER OBJECT of the present invention is to provide a crimpable separable tubing clamp that is simple to use.

BRIEFLY STATED, STILL YET ANOTHER OBJECT of the present invention is to provide a crimpable compression clamp that secures a tube onto a fitting and is able to be installed and removed without having to separate the tube and the fitting from each other. The crimpable compression clamp includes an inner band portion and an outer band portion. The inner band portion is detachably attached in the outer band portion so as to allow the crimpable compression clamp to be installed and removed without having to separate the tube and the fitting from each other by merely separating the outer band portion and the inner band portion from each other.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows.

A MARSHALING OF REFERENCE NUMERALS UTILIZED IN THE DRAWING

Figure 1:
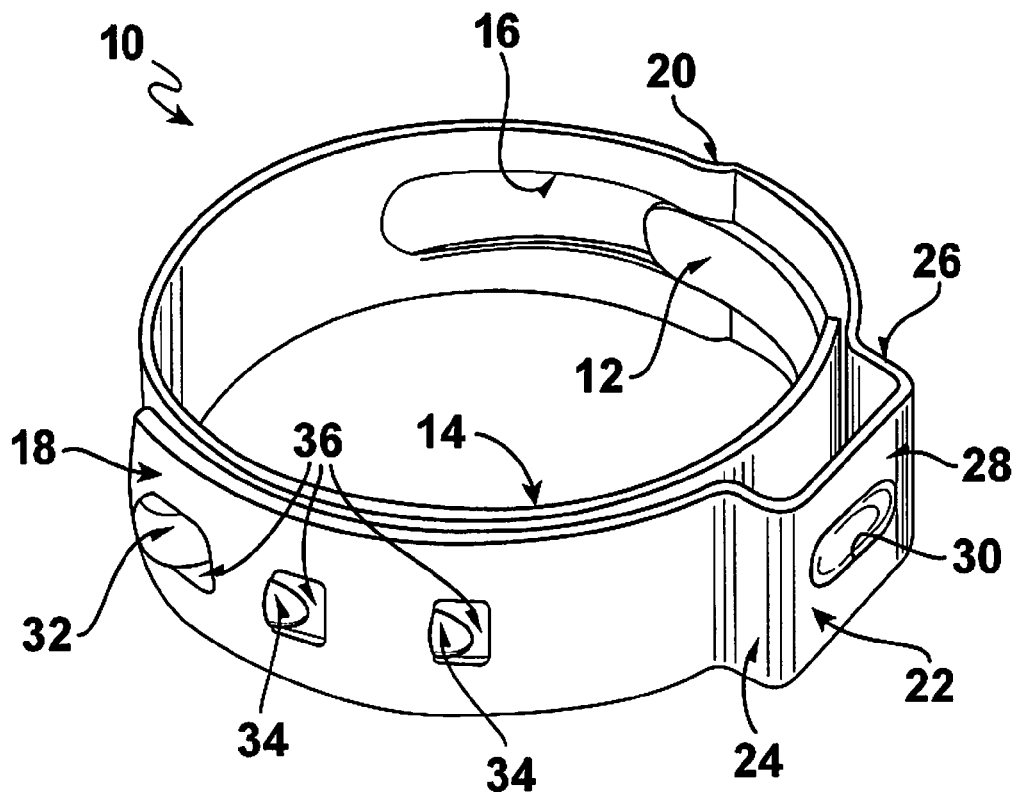
FIG. 1 is a diagrammatic perspective view of a prior art crimpable non-separable tubing clamp per se.
Figure 2:
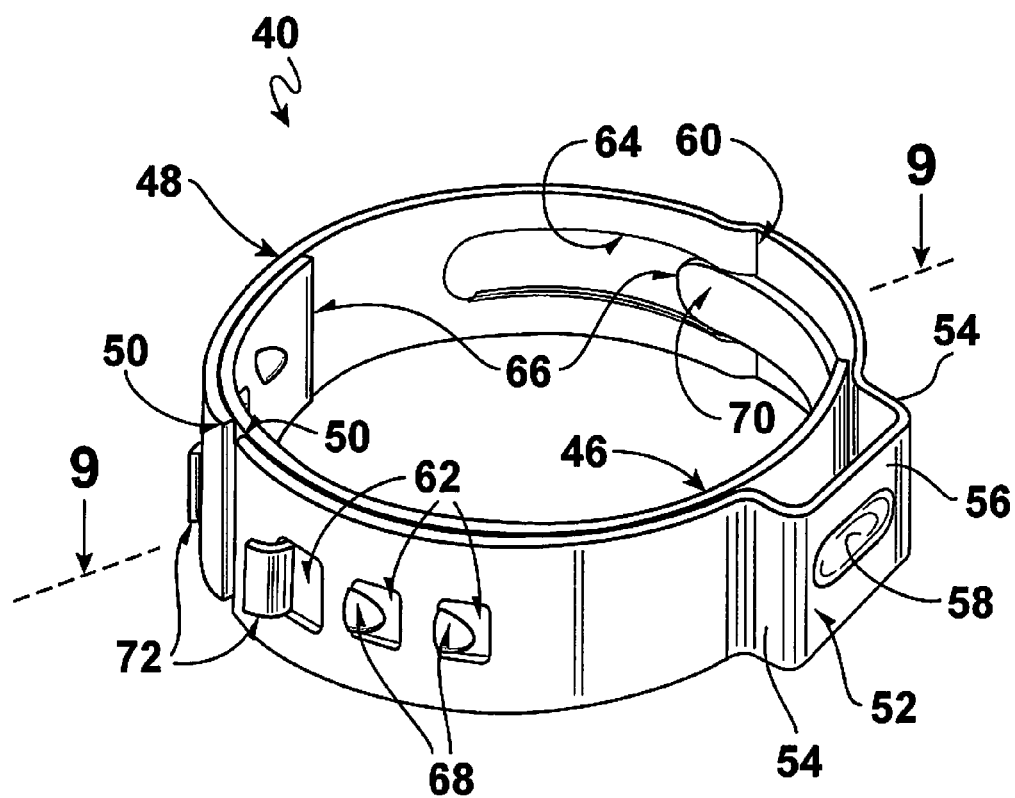
FIG. 2 is a diagrammatic perspective view of a crimpable separable tubing clamp per se of the present invention.

Prior Art 10 hose clamp
12 tongue-like extension of inner band portion 14
14 inner band portion
16 through opening of outer band portion 18
18 outer band portion
20 step-like portion of outer band portion 18
22 "Oetiker" ear
24 outwardly extending leg portion of "Oetiker" ear 22
26 other outwardly extending leg portion of "Oetiker" ear 22
28 bridging portion of "Oetiker" ear 22
30 reinforcing through groove of bridging portion 28 of "Oetiker" ear 22
32 guide or suspension hook of inner band portion 14
34 two cold-deformed, deep-drawn support hooks of inner band portion 14
36 through apertures of outer band portion 18

Present Invention 40 crimpable compression clamp of embodiments of present invention for securing tube 42 onto fitting 44 and for being able to be installed and removed without having to separate tube 42 and fitting 44 from each other
42 tube
44 fitting
46 inner band portion
48 outer band portion
50 pair of free ends of outer band portion 48
52 Oetiker ear of outer band portion 48
54 pair of parallel outwardly extending leg portions of Oetiker ear 52 of outer band portion 48
56 bridge portion of Oetiker ear 52 of outer band portion 48
58 reinforcing through groove of bridge portion 56 of Oetiker ear 52 of outer band portion 48
60 step-like portion of outer band portion 48
62 pair of three through apertures of outer band portion 48
64 through opening of outer band portion 48
66 pair of free ends of inner band portion 46
68 two pair of support hooks of inner band portion 46
70 tongue extension of inner band portion 46
72 pair of guide or suspension hooks of inner band portion 46

DETAILED DESCRIPTION OF THE PREFERRED EMBODIMENT

Figure 3:
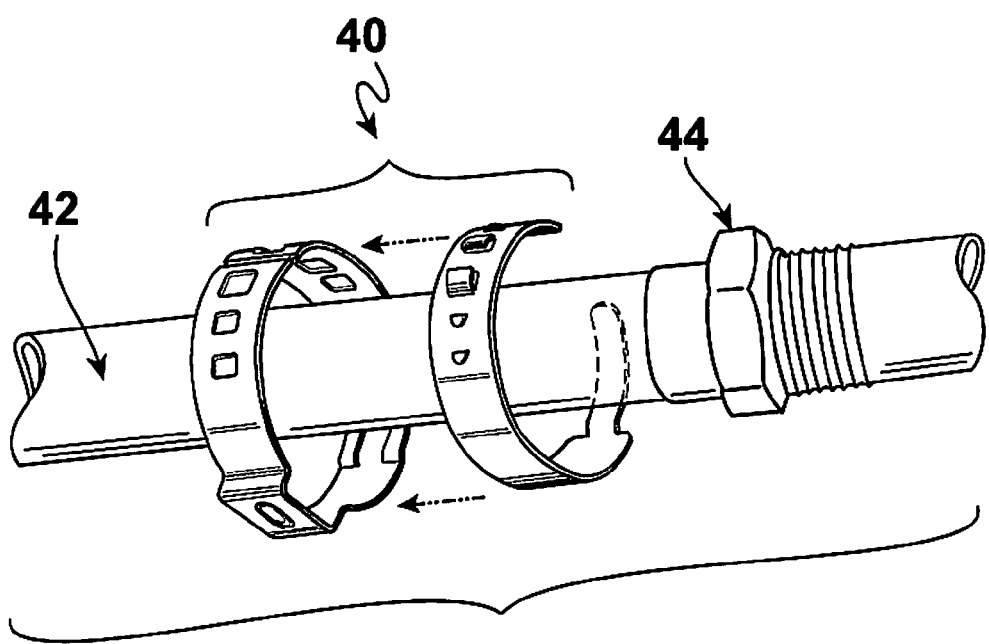
FIG. 3 is a diagrammatic perspective view showing the crimpable separable tubing clamp being assembled placed at an appropriate pipe joint.
Figure 4:
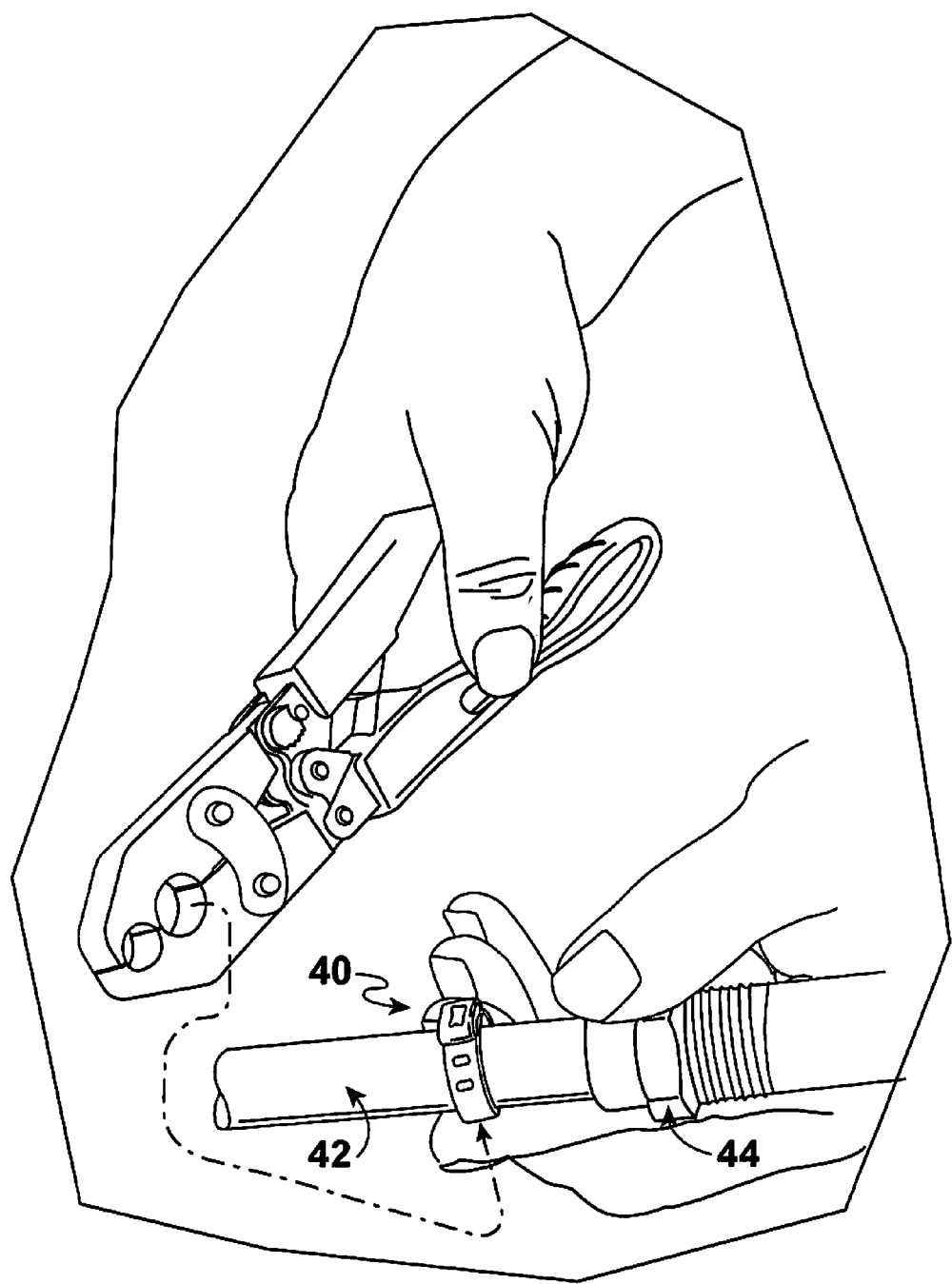
FIG. 4 is a diagrammatic perspective view showing the crimpable separable tubing clamp about to be crimped with a cooperating crimping tool.
Figure 5:
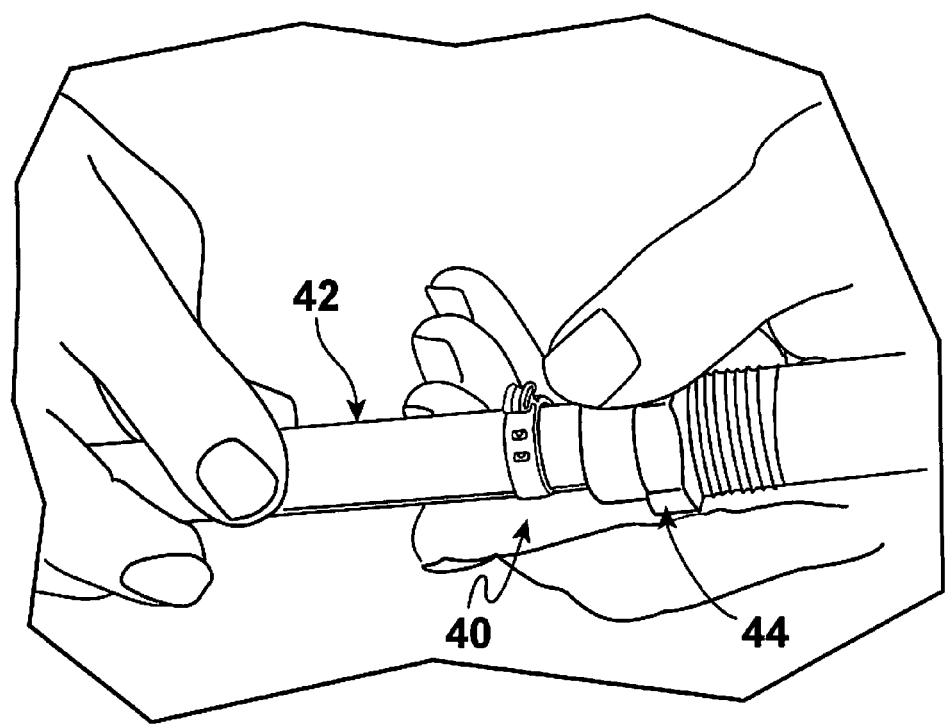
FIG. 5 is a diagrammatic perspective view showing the crimpable separable tubing clamp after it has been securely crimped.
Figure 6:
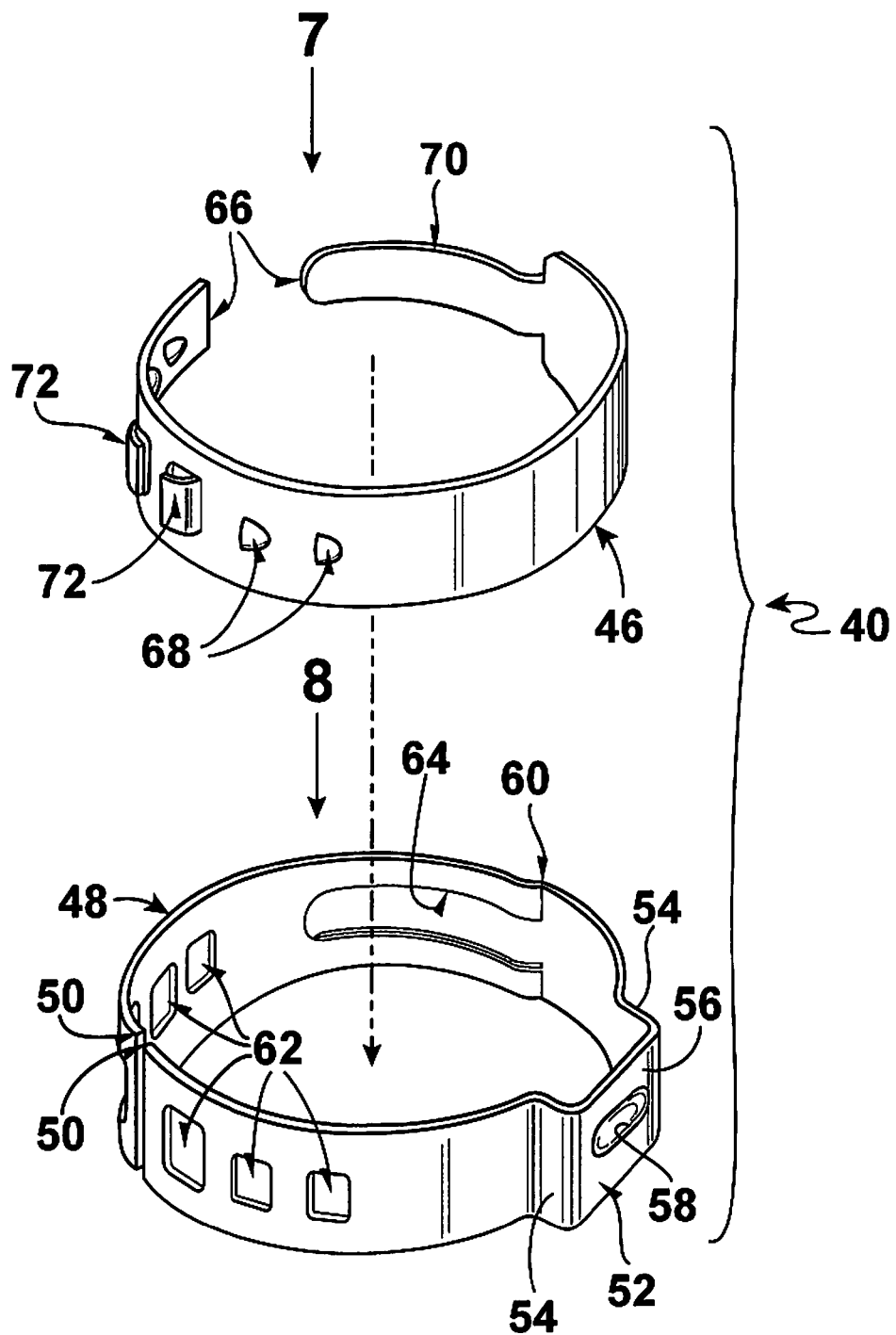
FIG. 6 is a diagrammatic perspective view showing the two separate components of the crimpable separable tubing clamp prior to assembly.
Figure 7:
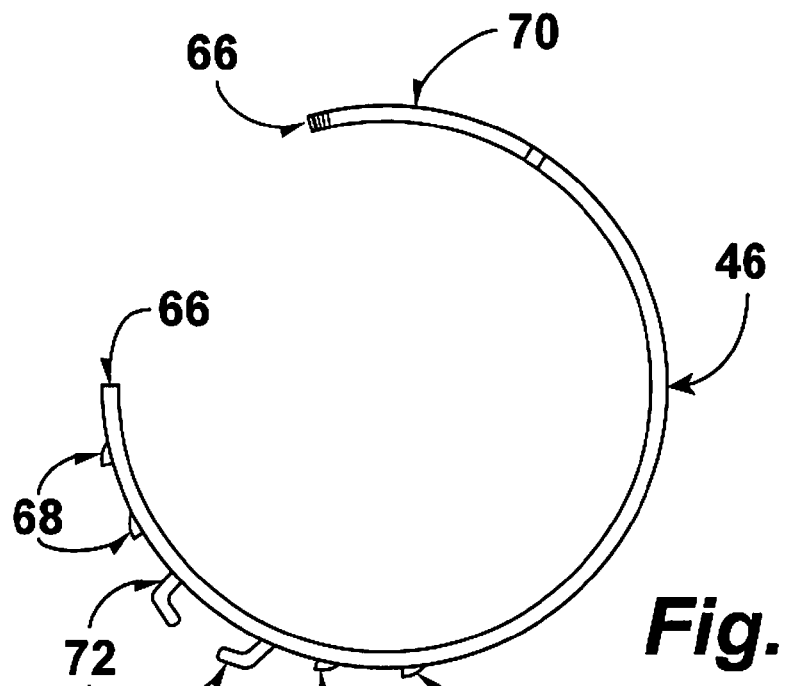
FIG. 7 is a plan view taken in the direction of arrow 7 of just an inner component shown in FIG. 6.
Figure 8:
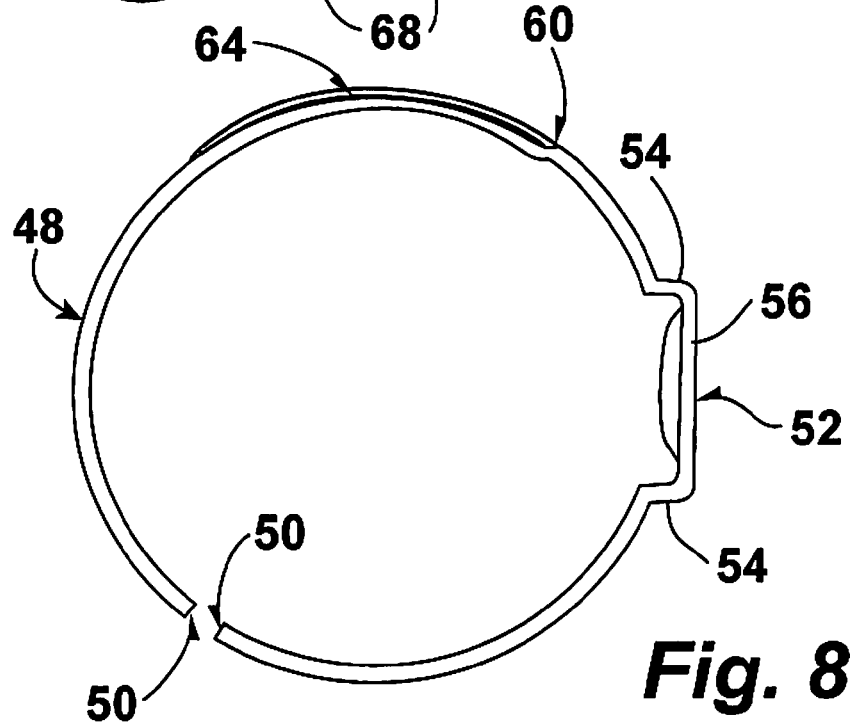
FIG. 8 is a plan view taken in the direction of arrow 8 of just an outer component shown in FIG. 6.
Figure 9:
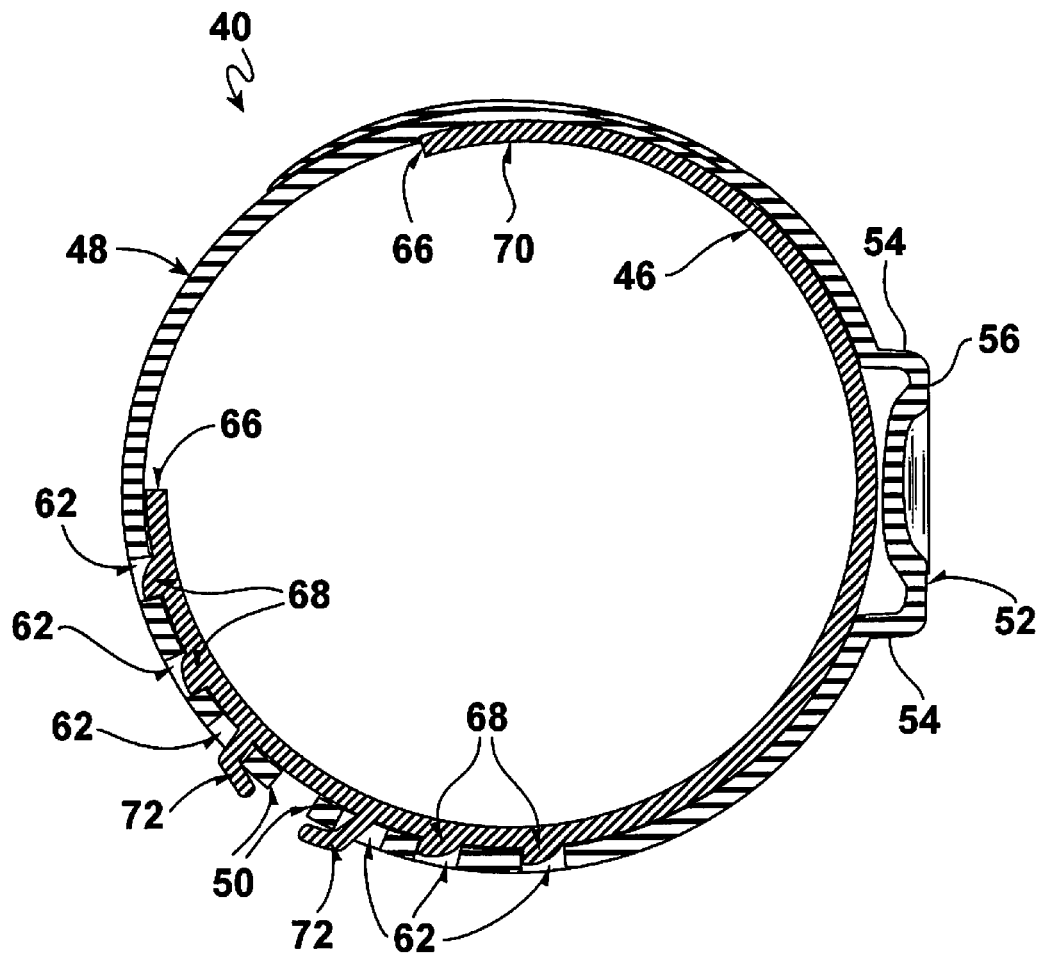
FIG. 9 is a cross sectional view taken on line 9-9 in FIG. 2.

Referring now to the figures, in which like numerals indicate like parts, and particularly to FIGS. 3, 4, and 5, the crimpable compression clamp of the embodiments of the present invention is shown generally at 40 for securing a tube 42 onto a fitting 44 and for being able to be installed and removed without having to separate the tube 42 and the fitting 44 from each other.

The configuration of the crimpable compression clamp 40 can best be seen in FIGS. 2, 6, 7, 8, and 9, and as such, will be discussed with reference thereto.

The crimpable compression clamp 40 comprises an inner band portion 46 and an outer band portion 48. The inner band portion 46 is detachably attached in the outer band portion 48 for allowing the crimpable compression clamp 40 to be installed and removed without having to separate the tube 42 and the fitting 44 from each other by merely separating the outer band portion 48 and the inner band portion 46 from each other.

The outer band portion 48 is separate and distinct from the inner band portion 46 for allowing the crimpable compression clamp 40 to be installed and removed without having to separate the tube 42 and the fitting 44 from each other by merely separating the outer band portion 48 and the inner band portion 46 from each other.

The outer band portion 48 is generally circular, and has a pair of free ends 50.

The outer band portion 48 further has an Oetiker ear 52.

The Oetiker ear 52 of the outer band portion 48 has a pair of parallel outwardly extending leg portions 54 connected to each other by a bridge portion 56.

The bridge portion 56 of the Oetiker ear 52 of the outer band portion 48 has a reinforcing through groove 58.

The outer band portion 48 further has a step-like portion 60.

The outer band portion 48 further has a pair of three through apertures 62.

The outer band portion 48 further has a through opening 64.

The pair of free ends 50 of the outer band portion 48 are adjacent to each other and slightly spaced-apart from each other.

The step-like portion 60 of the outer band portion 48 is disposed to one side of the Oetiker ear 52 of the outer band portion 48.

Each pair of three through apertures 62 of the outer band portion 48 are disposed adjacent to an associated free end 50 of the outer band portion 48.

The through opening 64 of the outer band portion 48 is slender and elongated, and originates at the step-like portion 60 of the outer band portion 48.

The inner band portion 46 sits coaxially in the outer band portion 48.

The inner band portion 46 is generally circular, and has a pair of free ends 66.

The inner band portion 46 further has two pair of support hooks 68.

The two pair of support hooks 68 of the inner band portion 46 are two pair of cold-deformed and deep drawn support hooks.

The two pair of support hooks 68 of the inner band portion 46 are disposed adjacent one free end 66 of the inner band portion 46.

Each pair of support hooks 68 of the inner band portion 46 releasably engage in an associated pair of through apertures 62 of the outer band portion 48.

The inner band portion 46 further has a tongue extension 70.

The tongue extension 70 of the inner band portion 46 extends to the other free end 66 of the inner band portion 46.

The tongue extension 70 of the inner band portion 46 rides releasably in the through opening 64 of the outer band portion 48.

The pair of free ends 66 of the inner band portion 46 are spaced-apart from each other and face each other.

The two pair of support hooks 68 of the inner band portion 46 are disposed adjacent to one free end 66 of the inner band portion 46.

The tongue extension 70 of the inner band portion 46 is slender and elongated.

The inner band portion 46 further has a pair of guide/suspension hooks 72.

The pair of guide/suspension hooks 72 of the inner band portion 46 are disposed between the two pair of support hooks 68 of the inner band portion 46, and releasably engage in an associated pair of through apertures 62 of the outer band portion 48 that straddle the pair of free ends 50 of the outer band portion 48, and in so doing, maintains the outer band portion 48 around the inner band portion 46.

It will be understood that each of the elements described above, or two or more together, may also find a useful application in other types of constructions differing from the types described above.

While the invention has been illustrated and described as embodiments of a crimpable separable tubing clamp, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A crimpable compression clamp for securing a tube onto a fitting and for being able to be installed without having to separate the tube and the fitting from each other, comprising:
   a) an inner band portion having a pair of free ends such that there is a space therebetween; and
   b) an outer band portion having a pair of free ends such that there is a space therebetween,
   wherein one of said inner band portion and said outer band portion has at least two apertures, and the other has at least two hooks that can be aligned with said apertures when assembled so as to retain said portions together such that said inner band portion is detachably attached in said outer band portion,
   wherein said outer band portion substantially encompasses said pair of free ends of said inner band portion,
   wherein said outer band portion has an Oetiker ear, and
   wherein said outer band portion has a step-like portion.

2. The crimpable compression clamp of claim 1, wherein said outer band portion is separate and distinct from said inner band portion.

3. The crimpable compression clamp of claim 1, wherein said outer band portion is generally circular.

4. The crimpable compression clamp of claim 1, wherein said Oetiker ear of said outer band portion has a pair of parallel outwardly extending leg portions and a bridge portion, wherein said pair of parallel outwardly extending leg portions are connected to each other by said bridge portion.

5. The crimpable compression clamp of claim 1, wherein said bridge portion of said Oetiker ear of said outer band portion has a reinforcing through groove.

6. The crimpable compression clamp of claim 1, wherein said outer band portion has a pair of three through apertures.

7. The crimpable compression clamp of claim 6, wherein said outer band portion has a through opening.

8. The crimpable compression clamp of claim 1, wherein said pair of free ends of said outer band portion are adjacent to each other.

9. The crimpable compression clamp of claim 1, wherein said pair of free ends of said outer band portion are slightly spaced-apart from each other.

10. The crimpable compression clamp of claim 1, wherein said step-like portion of said outer band portion is disposed to one side of said Oetiker ear of said outer band portion.

11. The crimpable compression clamp of claim 6, wherein each pair of three through apertures of said outer band portion are disposed adjacent to an associated free end of said outer band portion.

12. The crimpable compression clamp of claim 7, wherein said through opening of said outer band portion is slender.

13. The crimpable compression clamp of claim 7, wherein said through opening of said outer band portion is elongated.

14. The crimpable compression clamp of claim 7, wherein said through opening of said outer band portion originates at said step-like portion of said outer band portion.

15. The crimpable compression clamp of claim 1, wherein said inner band portion sits coaxially in said outer band portion.

16. The crimpable compression clamp of claim 1, wherein said inner band portion is generally circular.

17. The crimpable compression clamp of claim 7, wherein said inner band portion has two pair of support hooks.

18. The crimpable compression clamp of claim 17, wherein said two pair of support hooks of said inner band portion are two pair of cold-deformed and deep drawn support hooks.

19. The crimpable compression clamp of claim 17, wherein said two pair of support hooks of said inner band portion are disposed adjacent one free end of said inner band portion.

20. The crimpable compression clamp of claim 17, wherein each pair of support hooks of said inner band portion releasably engage in an associated pair of through apertures of said outer band portion.

21. The crimpable compression clamp of claim 19, wherein said inner band portion has a tongue extension.

22. The crimpable compression clamp of claim 21, wherein said tongue extension of said inner band portion extends to the other free end of said inner band portion.

23. The crimpable compression clamp of claim 21, wherein said tongue extension of said inner band portion rides releasably in said through opening of said outer band portion.

24. The crimpable compression clamp of claim 7, wherein said pair of free ends of said inner band portion are spaced-apart from each other.

25. The crimpable compression clamp of claim 7, wherein said pair of free ends of said inner band portion face each other.

26. The crimpable compression clamp of claim 17, wherein each pair of support hooks of said inner band portion are disposed adjacent to one free end of said inner band portion.

27. The crimpable compression clamp of claim 21, wherein said tongue extension of said inner band portion is slender.

28. The crimpable compression clamp of claim 21, wherein said tongue extension of said inner band portion is elongated.

29. A crimpable compression clamp for securing a tube onto a fitting and for being able to be installed without having to separate the tube and the fitting from each other, comprising:
　a) an inner band portion; and
　b) an outer band portion,
　　wherein said inner band portion is detachably attached in said outer band portion,
　　wherein said outer band portion has a pair of free ends, an Oetiker ear, a step-like portion, a pair of three through apertures, and a through opening, and
　　wherein said inner band portion has a pair of free ends, two pair of support hooks, and a pair of guide/suspension hooks.

30. The crimpable compression clamp of claim 29, wherein said pair of guide/suspension hooks of said inner band portion are disposed between said two pair of support hooks of said inner band portion.

31. The crimpable compression clamp of claim 29, wherein said pair of guide/suspension hooks of said inner band portion releasably engage in an associated pair of through apertures of said outer band portion that straddle said pair of free ends of said outer band portion, and in doing so, maintains said outer band portion around said inner band portion.

32. The crimpable compression clamp of claim 1, wherein one of said at least two hooks and said at least two apertures are on each side of the space between said pair of free ends of the outer band portion.

33. A crimpable compression clamp for securing a tube onto a fitting and for being able to be installed without having to separate the tube and the fitting from each other, comprising:
　a) an inner band portion having an inner surface, an outer surface, and a pair of free ends; and
　b) an outer band portion having an inner surface, an outer surface, and a pair of free ends,
　　wherein said inner band portion is detachably attached in said outer band portion such that all of said outer surface of said inner band portion is in contact with said inner surface of said outer band portion except for a portion of said outer surface of said inner band portion which corresponds to a space between the pair of free ends of the outer band portion.

34. The crimpable compression clamp of claim 33, wherein said pair of free ends of said outer band portion is in contact with said outer surface of said inner band portion.

35. The crimpable compression clamp of claim 33, wherein said pair of free ends of said inner band portion is in contact with said inner surface of said outer band portion.

* * * * *